Patented Jan. 20, 1948

2,434,715

UNITED STATES PATENT OFFICE 2,434,715

GLUTAMIC ACID-FREE PROTEIN HYDROLYSATE AND THE PRODUCTION THEREOF

Harold S. Olcott and James C. Lewis, Berkeley, Calif., assignors to the United States of America, as represented by the Secretary of Agriculture No Drawing. Application February 9, 1945, Serial No. 576,995

8 Claims. (Cl. 260—313)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to glutamic acid-free protein hydrolysate suitable for use in microbiological assays for glutamic acid.

Within recent years, it has been possible to measure accurately the quantity of certain biologically important components in various materials by the effects of the materials on the growth, or other metabolic activities (such as acid production), of micro-organisms. For example, satisfactory methods are available for the quantitative determination of various vitamins, and similar new methods are in process of development for the quantitative determination of amino acids.

In order to carry out such assays, it is necessary to provide the micro-organism with a prepared culture medium containing all components necessary for growth except the component to be assayed. With such a medium, it is possible to compare the growth induced by the addition of the material under test with that induced by the addition of known amounts of the missing component to the prepared culture medium thus to obtain a quantitative measure of the amount of the component in the material under test.

The factors necessary for the growth of certain micro-organisms are known in some detail and include vitamins, amino acids, and minerals. If a material containing a specific vitamin is to be assayed for that particular vitamin, the other vitamins are supplied in the prepared medium in pure form or as concentrates, and the amino acids are usually supplied principally in the form of a hydrolysate of casein, which is known to contain the proper number and amounts of amino acids for maximal growth. However, according to present practices, when an amino acid is to be assayed, it is necessary to form the prepared medium by supplying the other essential amino acids in the form of expensive, highly-purified crystalline preparations, since most protein hydrolysates contain practically all of the amino acids.

Particularly has this been true in the case of microbiological assays for glutamic acid, which is one of the most generally abundant amino acids in proteins. Thus, casein contains approximately 20 percent of glutamic acid, and hence a simple casein hydrolysate is not suitable for use in the prepared medium for glutamic acid assay.

This invention has among its objects the preparation in an economical manner of a protein hydrolysate which is essentially free of glutamic acid, and such other objects as will be apparent from the following description and claims.

According to the invention, glutamic acid is removed from known type hydrolysates of proteins without interfering with the other essential amino acids present in the hydrolysate except possibly cystine.

A casein hydrolysate, which is essentially freed of glutamic acid when prepared according to this invention, has been found to be suitable for supplying the major portion of the amino acids required for the microbiological assay of glutamic acid. In one such assay method, the medium must be supplemented with tryptophane, since tryptophane is always destroyed by the known type acid hydrolysis procedure employed in forming the initial hydrolysate, and with cystine, which is partially destroyed by the procedure employed in removing the glutamic acid according to the present invention. But the cost of such supplementation is minor in comparison with the cost of supplying all of the amino acids in pure form.

In general, according to this invention, glutamic acid in the known type acid hydrolysate of the protein, in which the protein is hydrolyzed to the constituent amino acids, is transformed into its lactam (pyrrolidone carboxylic acid). This is accomplished by proper adjustment of the pH of the hydrolysate and heating it. The lactam is then preferably extracted in a continuous extractor with ethyl acetate, which removes very little else. The transformation of glutamic acid to the lactam may be only 90 percent to 95 percent complete in one run. Therefore, it may be necessary to repeat the steps mentioned as many times as required to reduce the glutamic acid content to a negligible quantity.

The following is a typical example:

Example

Five hundred grams of technical casein is mixed with 2500 ml. of concentrated hydrochloric acid and boiled under a reflux condenser for 16 hours to hydrolyze the protein to the constituent amino acids. The excess hydrochloric acid is then removed by distillation, preferably in vacuo. When the mixture is reduced to a thick sirup, water is added and the distillation continued. By repeating this treatment several times, at least 85 percent of the hydrochloric acid can be removed. Substantial removal of the hydrochloric acid is advantageous if it is desired to keep the salt concentration in the final preparation as low as possible.

The thick sirup is then dissolved in about 2000 ml. of water and filtered to remove humin and lipid material.

The filtered hydrolyzed extract is then adjusted to a pH of 3.0 by the addition of a strong sodium hydroxide solution (the equivalent of about 120 grams of solid sodium hydroxide is required) and is autoclaved at 120°–125° C. for 4 hours. Considerable insoluble material separates and should be removed by filtration.

The resulting solution is then extracted continuously for 48 hours in a liquid-liquid extractor with ethyl acetate to remove the formed lactam of the glutamic acid, the steps of autoclaving and extracting being repeated three or four times. The final solution is heated to remove traces of ethyl acetate, filtered, and is then suitable for use in the prepared culture medium.

Variations may be made in the procedure. For example, the protein can be hydrolyzed with other mineral acids, particularly sulfuric acid, which can then be removed by the addition of barium hydroxide. This variation is of advantage when low salt concentrations are desirable.

Also, the transformation of the glutamic acid to its lactam can be effected anywhere within the pH range about from 2 to 11, the pH of about 3 being, however, convenient and preferred. The autoclave temperature can be in the range about from 115° to 140° C., the higher the temperature the shorter the heating time required, but products of decomposition begin to interfere at the higher temperatures.

For the extraction of the lactam with ethyl acetate the hydrolysate should be adjusted within the pH range about from 1.5 to 3.0, since it is known that the solvent action of ethyl acetate for the lactam is most specific within this range. It is most advantageous, however, to adjust the pH to about 3.0 for both heating and extraction as this avoids the necessity of adjusting the pH level at each step with the consequent accumulation of inorganic salts.

Casein has been used as the original protein in the above example because casein hydrolysate is known to contain in sufficient amounts most of the amino acids necessary for bacterial growth. Other proteins or protein mixtures such as meat scrap, soybean protein, and so forth, may be equally suitable, and the removal of glutamic acid from the hydrolysates of such other proteins may be accomplished in substantially the same manner as has been described relative to casein hydrolysate.

Having thus described the invention, what is claimed is:

1. The process of preparing a protein hydrolysate which is substantially free of glutamic acid, comprising transforming the glutamic acid contained in a protein which has been hydrolyzed to the constituent amino acids into its lactam by adjusting the pH of the hydrolysate to the range about from 2 to 11 and heating in the range about from 115° to 140° C., and then separating the lactam from the hydrolysate.

2. The process of preparing a protein hydrolysate which is substantially free of glutamic acid, comprising transforming the glutamic acid contained in a protein which has been hydrolyzed to the constituent amino acids into its lactam by adjusting the pH of the hydrolysate to the range about from 2 to 11 with sodium hydroxide and heating in the range about from 115° to 140° C., and then separating the lactam from the hydrolysate.

3. The process of preparing a protein hydrolysate which is substantially free of glutamic acid, comprising transforming the glutamic acid contained in a protein which has been hydrolyzed to the constituent amino acids into its lactam by adjusting the pH of the hydrolysate to about 3 with sodium hydroxide and heating in the range about from 115° to 140° C., and then extracting the lactam with ethyl acetate at the adjusted pH of the hydrolysate.

4. The process of preparing a protein hydrolysate which is substantially free of glutamic acid, comprising transforming the glutamic acid contained in a protein which has been hydrolyzed to the constituent amino acids into its lactam by adjusting the pH of the hydrolysate to the range about from 2 to 11 and heating in the range about from 115° to 140° C., and then separating the lactam from the hydrolysate by extracting the lactam with ethyl acetate within a pH range of the hydrolysate about from 1.5 to 3.0.

5. The process of preparing a casein hydrolysate which is substantially free of glutamic acid, comprising transforming the glutamic acid in casein which has been hydrolyzed to the constituent amino acids into its lactam by adjusting the pH of the hydrolysate to the range about from 2 to 11 and heating in the range about from 115° to 140° C., and then separating the lactam from the hydrolysate by extracting the lactam with ethyl acetate within a pH range of the hydrolysate about from 1.5 to 3.0.

6. The process of preparing a casein hydrolysate which is substantially free of glutamic acid, comprising treating casein with a mineral acid to hydrolyze the casein to the constituent amino acids, transforming the glutamic acid contained in the hydrolysate into its lactam by adjusting the pH of the hydrolysate to the range about from 2 to 11 and heating in the range about from 115° to 140° C., and then separating the lactam from the hydrolysate by extracting the lactam with ethyl acetate within a pH range of the hydrolysate about from 1.5 to 3.0.

7. The process of preparing a casein hydrolysate which is substantially free of glutamic acid, comprising treating casein with a mineral acid to hydrolyze the casein to the constituent amino acids, removing excess acid, transforming the glutamic acid contained in the hydrolysate into its lactam by adjusting the pH of the hydrolysate to about 3 and heating in the range about from 115° to 140° C., and then separating the lactam from the hydrolysate by extracting the lactam with ethyl acetate at the adjusted pH of the hydrolysate.

8. The process of preparing a casein hydrolysate which is substantially free of glutamic acid, comprising treating casein with a mineral acid to hydrolyze the casein to the constituent amino acids, removing excess acid, transforming the glutamic acid contained in the hydrolysate into its lactam by adjusting the pH of the hydrolysate to about 3 and heating in the range from 120° to 125° C. for about hours, and then separating the lactam from the hydrolysate by extracting the lactam with ethyl acetate at the adjusted pH of the hydrolysate, and repeating the processes of heating and extracting as often as necessary to remove essentially all the glutamic acid from the hydrolysate.

HAROLD S. OLCOTT.
JAMES C. LEWIS.

REFERENCES CITED

The following references are of record in the file of this patent:

UNITED STATES PATENTS

| Number | Name | Date |
|---|---|---|
| 1,973,574 | Marshall | Sept. 11, 1934 |
| 2,112,329 | Braun | Mar. 29, 1938 |

OTHER REFERENCES

Jones et al., Cereal Chemistry, vol. V, No. 6 (1928), pages 473–477.